(12) United States Patent
Reilly

(10) Patent No.: US 8,806,961 B1
(45) Date of Patent: Aug. 19, 2014

(54) PORTABLE PNEUMATIC IMPACT WRENCH TESTING MACHINE

(71) Applicant: Thomas W. Reilly, Tucson, AZ (US)

(72) Inventor: Thomas W. Reilly, Tucson, AZ (US)

(*) Notice: Subject to any disclaimer, the term of this patent is extended or adjusted under 35 U.S.C. 154(b) by 81 days.

(21) Appl. No.: 13/746,517

(22) Filed: Jan. 22, 2013

(51) Int. Cl.
*B25B 23/14* (2006.01)
*B25B 17/00* (2006.01)

(52) U.S. Cl.
CPC .................... *B25B 23/1405* (2013.01)
USPC ........................ 73/862.21; 73/865.9

(58) Field of Classification Search
CPC .......... B25B 21/00; B25B 1/00; B25B 17/00; G01L 25/03
USPC .......................... 73/862.21, 761, 865.8, 865.9
See application file for complete search history.

(56) References Cited

U.S. PATENT DOCUMENTS

| | | |
|---|---|---|
| 3,456,486 A | 7/1969 | Kross |
| 4,322,965 A | 4/1982 | Bickford |
| 4,562,722 A | 1/1986 | Schuele |
| 4,759,225 A * | 7/1988 | Reynertson et al. ....... 73/862.21 |
| D322,041 S | 12/1991 | Jenkins |
| 5,099,678 A * | 3/1992 | Grabovac et al. .............. 73/1.11 |
| 5,181,425 A * | 1/1993 | Livingston ................. 73/862.08 |
| 5,703,277 A | 12/1997 | Grabovac |
| D540,474 S | 4/2007 | Echols |
| 7,757,540 B2 * | 7/2010 | Dabrowski ..................... 73/1.12 |
| 8,117,887 B2 * | 2/2012 | Schwafertz et al. ........... 73/1.12 |
| 8,650,928 B2 * | 2/2014 | Herbold ......................... 73/1.12 |
| 8,713,986 B2 * | 5/2014 | Hsieh ............................. 73/1.12 |

* cited by examiner

*Primary Examiner* — Max Noori
(74) *Attorney, Agent, or Firm* — Kyle A. Fletcher, Esq.

(57) ABSTRACT

The portable pneumatic impact wrench testing machine is a portable torque tester that tests the torque output of a pneumatic impact wrench. The machine includes a first member that is hingedly attached to a second member via a hinge member. A hydraulic jack is positioned between the first member and the second member, and includes a gauge that translates compression or pressure imposed on the hydraulic jack into torque that an impact wrench is inputting. A bolt member is positioned between the hinge member and hydraulic jack, and the bolt member passes across the first member and the second member. A nut extends on an outer surface of the second member, and is threadably engaged to the bolt member. The impact wrench rotates said nut thereby squeezing the first member towards the second member in order to compress the hydraulic jack positioned there between.

16 Claims, 5 Drawing Sheets

PORTABLE PNEUMATIC IMPACT WRENCH TESTING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of torque testers, more specifically, improvements to portable pneumatic impact wrench testing machines.

B. Discussion of the Prior Art

As a preliminary note, it should be stated that there is an ample amount of prior art that deals with torque testing equipment, generally speaking. As will be discussed immediately below, no prior art discloses a portable torque tester that is uniquely designed to be used with pneumatic impact wrenches; wherein the portable torque testing machine is comprised of a first member that is hingedly attached to a second member; wherein a hydraulic jack is positioned between the first member and the second member; wherein a bolt member is positioned between the hinge member and hydraulic jack; wherein the bolt member passes across the first member and the second member; wherein a nut extends on an outer surface of the second member; wherein an impact wrench rotates said nut thereby squeezing the first member towards the second member in order to compress the hydraulic jack positioned there between; as the hydraulic jack is compressed a gauge associated with the hydraulic jack indicates the level of torque generated via the impact wrench.

The Dabrowski patent (U.S. Pat. No. 7,757,540) discloses a stationary device for testing torque wrenches. However, the torque wrench tester is not easily portable and requires that it be mounted to a sturdy surface, and also does not include a hydraulic jack and attached gauge to test an impact wrench.

The Grabovac patent (U.S. Pat. No. 5,703,277) discloses a torque tool testing machine. However, the torque tester is designed to be used with a torque wrench, and also does not include a hydraulic jack and attached gauge to test an impact wrench. Additionally, the torque tester requires an electronic processor to test torque.

The Bickford patent (U.S. Pat. No. 4,322,965) discloses a calibration test stand for hydraulic wrenches having an indicator dial. However, the torque tester is designed to test a hydraulically powered wrench.

The Kross patent (U.S. Pat. No. 3,456,486) discloses a device for measuring and calibrating a torque tool. However, the torque tester is designed to be used with a torque wrench, and also does not include a hydraulic jack to test an impact wrench.

The Schuele et al. patent (U.S. Pat. No. 4,562,722) discloses an impact wrench torque calibration tool. However, the torque tester does not include a hydraulic jack and attached gauge to test an impact wrench. Additionally, the torque tester requires electronic circuitry to test torque specifications.

The Jenkins patent (U.S. Pat. No. Des. 322,041) illustrates an ornamental design for a torque wrench tester. However, the torque wrench tester is not easily portable and requires that it be mounted to a sturdy surface, and also does not include a hydraulic jack and attached gauge to test an impact wrench.

While the above-described devices fulfill their respective and particular objects and requirements, they do not describe a portable torque tester that is uniquely designed to be used with pneumatic impact wrenches; wherein the portable torque testing machine is comprised of a first member that is hingedly attached to a second member; wherein a hydraulic jack is positioned between the first member and the second member; wherein a bolt member is positioned between the hinge member and hydraulic jack; wherein the bolt member passes across the first member and the second member; wherein a nut extends on an outer surface of the second member; wherein an impact wrench rotates said nut thereby squeezing the first member towards the second member in order to compress the hydraulic jack positioned there between; as the hydraulic jack is compressed a gauge associated with the hydraulic jack indicates the level of torque generated via the impact wrench. In this regard, the portable pneumatic impact wrench testing machine departs from the conventional concepts and designs of the prior art.

SUMMARY OF THE INVENTION

The portable pneumatic impact wrench testing machine is a portable torque tester that tests the torque output of a pneumatic impact wrench. The machine includes a first member that is hingedly attached to a second member via a hinge member. A hydraulic jack is positioned between the first member and the second member, and includes a gauge that translates compression or pressure imposed on the hydraulic jack into torque that an impact wrench is inputting. A bolt member is positioned between the hinge member and hydraulic jack, and the bolt member passes across the first member and the second member. A nut extends on an outer surface of the second member, and is threadably engaged to the bolt member. The impact wrench rotates said nut thereby squeezing the first member towards the second member in order to compress the hydraulic jack positioned there between. As the hydraulic jack is compressed, the gauge associated with the hydraulic jack indicates the level of torque generated via the impact wrench.

An object of the invention is to provide a portable torque testing machine that is specifically adapted for use in testing the output of a pneumatic impact wrench.

A further object of the invention is to provide a highly portable torque testing machine that does not require any means of clamping or otherwise securing the device to a stationary object, but can simply be laid flat or other orientation, and which enables quick assessment of the torque output of a pneumatic impact wrench.

An even further object of the invention is to provide a torque tester that employs the use of a bolt and nut that when rotated via the pneumatic impact wrench shall squeeze a hydraulic jack that is sandwiched between a first member and second member, and which registers the output of said hydraulic jack upon a gauge.

A further object of the invention is to include a first member and a second member that are rotatably engaged to one another via a hinge member.

Another object of the invention is to position the hydraulic jack at an opposing end of the first member and second member with respect to the hinge member.

An even further object of the invention is to place the bolt member between the hinge member and the hydraulic jack.

These together with additional objects, features and advantages of the portable pneumatic impact wrench testing machine will be readily apparent to those of ordinary skill in the art upon reading the following detailed description of presently preferred, but nonetheless illustrative, embodiments of the portable pneumatic impact wrench testing machine when taken in conjunction with the accompanying drawings.

In this respect, before explaining the current embodiments of the portable pneumatic impact wrench testing machine in detail, it is to be understood that the portable pneumatic impact wrench testing machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable pneumatic impact wrench testing machine.

It is therefore important that the claims be regarded as including such equivalent construction insofar as they do not depart from the spirit and scope of the portable pneumatic impact wrench testing machine. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
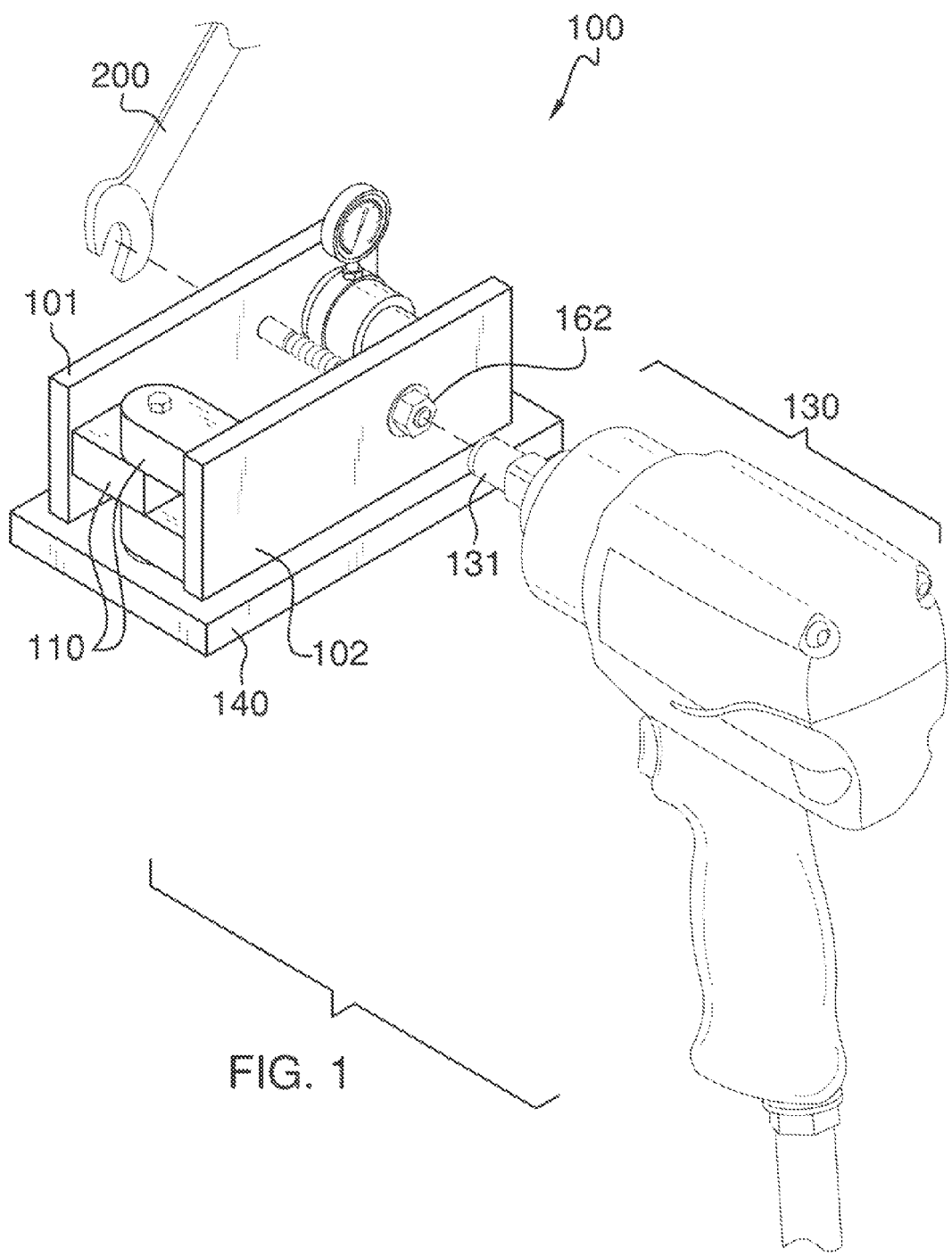
FIG. 1 illustrates a perspective view of the portable pneumatic impact wrench testing machine, and alignment of a pneumatic impact wrench as well as a handheld wrench.
Figure 2:
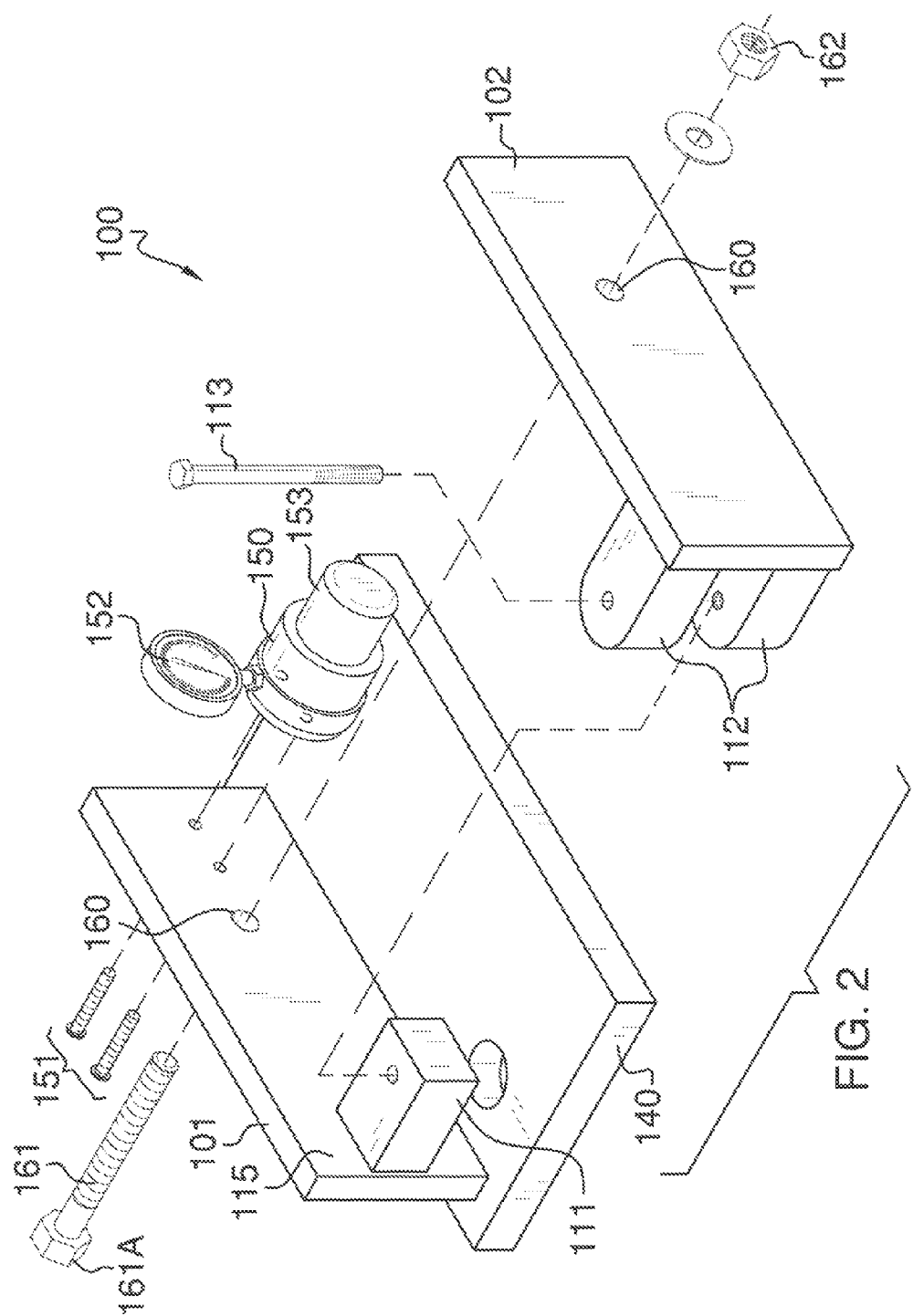
FIG. 2 illustrates an exploded view depicting the various components comprising the portable pneumatic impact wrench testing machine.
Figure 3:
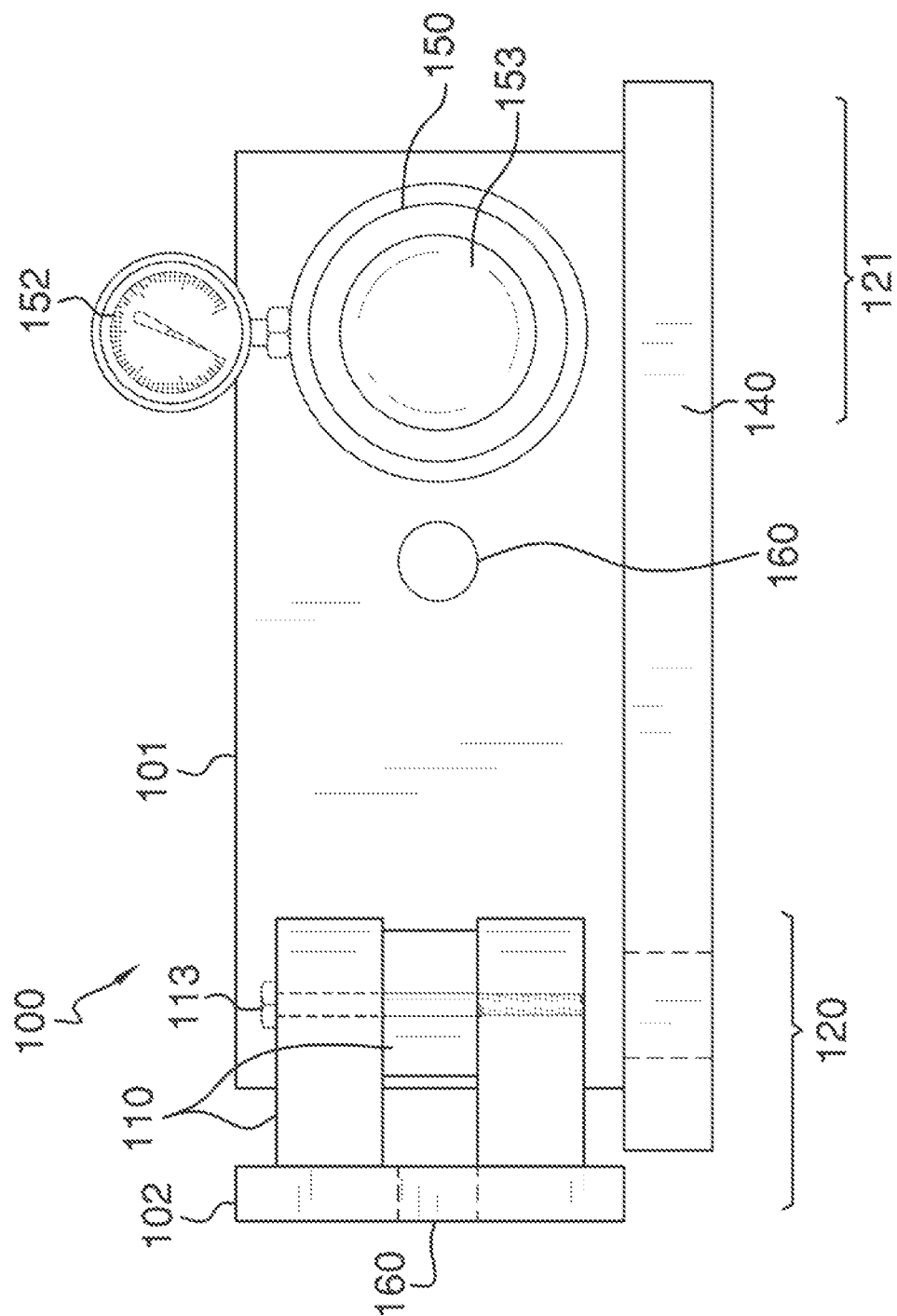
FIG. 3 illustrates a front view of the portable pneumatic impact wrench testing machine.
Figure 4:
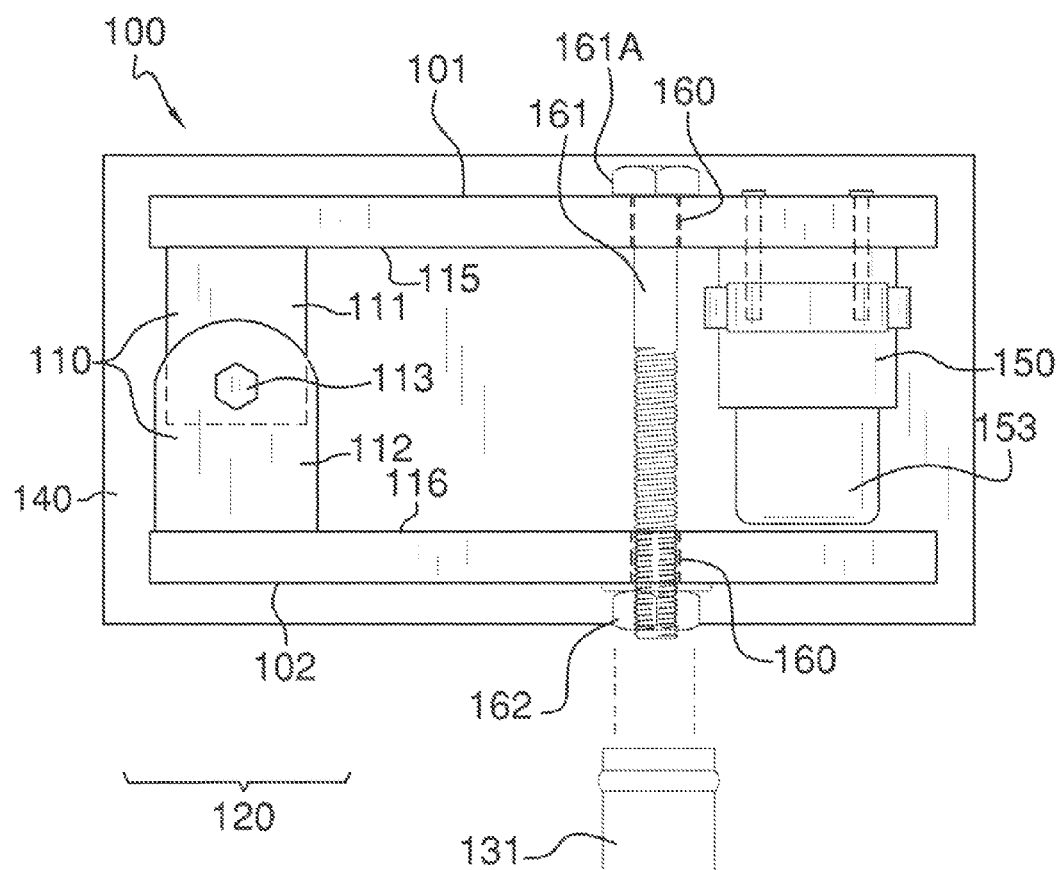
FIG. 4 illustrates a cross-sectional view depicting use of the torque tester with respect to a pneumatic impact wrench.
Figure 4:
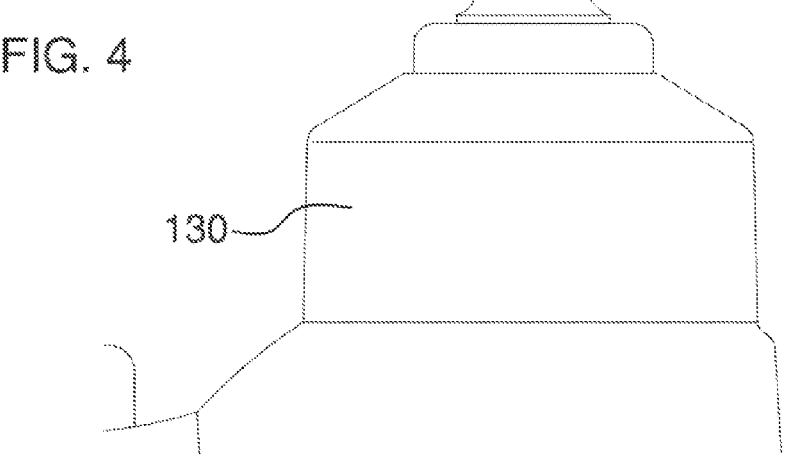
Figure 5:
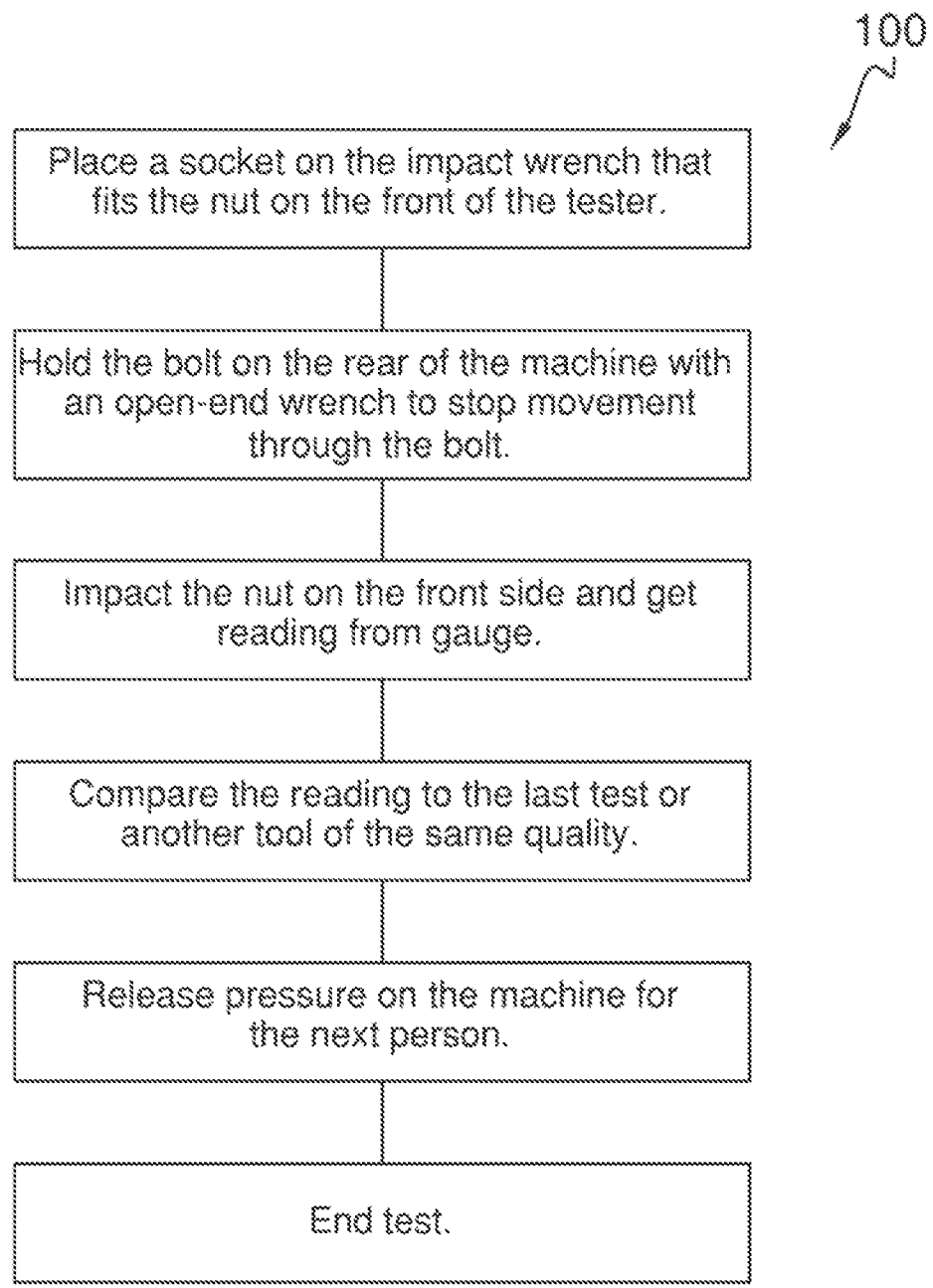
FIG. 5 illustrates a list of steps associated with testing a pneumatic impact wrench.

Detailed reference will now be made to the preferred embodiment of the present invention, examples of which are illustrated in FIGS. 1-5. A portable pneumatic impact wrench testing machine 100 (hereinafter invention) includes a first member 101 and a second member 102 that are collectively or the same size and shape and material. Moreover, the first member 101 and the second member 102 are plates of metal of no particular dimensions. The first member 101 attaches to and rotates with respect to the second member 102 via a hinged member 110. The hinged member 110 is located adjacent to a first distal end 120 of the invention 100. The hinged member 110 enables the first member 101 to rotate from an acute orientation to an obtuse orientation with respect to the second member 102.

It shall be noted that the first member 101 may be rigidly affixed to a base member 140. The base member 140 being perpendicularly oriented with respect to the first member 101 may offer a base upon which to place on a flat surface upon which the invention 100 may rest. The base member 140 is not at all affixed to the second member 102, but enables the hinged member 110 and the second member 102 the freedom to rotate thereabout.

The invention 100 includes a hydraulic jack 150 that is secured to the first member 101 via at least one securing member 151. The hydraulic jack 150 is situated at a second distal end 121 of the invention 100 such that the hinged member 110 is opposite of the hydraulic jack 150. The hydraulic jack 150 is further defined as including a gauge 152 and compression member 153. The placement of the hydraulic jack 150 at the second distal end 121 enables the first member 101 and the second member 102 the ability to squeeze together to an acute or non-parallel orientation during which the compression member 153 of the hydraulic jack 150 is exposed to compression or pressure that is expressed on the gauge 152.

It shall be noted that the gauge 152 is designed to display the output of a pneumatic impact wrench 130 in terms of torque and/or torque and pressure.

It shall be noted that the hinged member 110 is further defined as including a first hinged member 111 that is rigidly affixed to a first inner surface 115 of the first member 101. A second hinged member 112 is affixed to a second inner surface 116 of the second member 101. A hinged member bolt 113 extends across both the first hinged member 111 and the second hinged member 112 so as to provide manner of rotation of the hinged member 110 when so assembled.

The first member 101 and the second member 102 each include a bolt member hole 160 that are aligned with one another. The invention 100 includes a bolt member 161 that is designed to span across both the first member 101 and the second member 102 via the bolt member holes 160. It shall be noted that the bolt member holes 160 are located in between the first distal end 120 and the second distal end 121 such that the bolt member 161 is located in between the hydraulic jack 150 and the hinged member 110. The invention 100 includes a nut 162 that is able to thread onto the bolt member 161 from an exterior surface 117 of the second member 102.

In order for the pneumatic impact wrench 130 to be tested, the bolt member 161 must be locked in place. The bolt member 151 includes a bolt head 161A that is to be held in place via a wrench 200. Meanwhile, the pneumatic impact wrench 130 is affixed onto the nut 162 via a pneumatic wrench socket 131, which when rotated shall drive the nut 162 onto the bolt member 151 thereby squeezing the first member 101 towards the second member 102.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable pneumatic impact wrench testing machine comprising:
    a first member and a second member that rotate with respect to one another via a hinged member;
    wherein a hydraulic jack is sandwiched between the first member and the second member at a distal end opposite of the hinged member;
    wherein a bolt member passes across the first member and the second member, and which includes a nut that is threaded onto the bolt member at an outer surface of the second member;
    wherein the nut is configured for use with a pneumatic impact wrench, which when tightens said nut shall squeeze the first member towards the second member in order to compress the hydraulic jack positioned there between.

2. The portable pneumatic impact wrench testing machine as described in claim 1 wherein the hinged member is located adjacent to a first distal end of the first member and the second member whereas the hydraulic jack is sandwiched between the first member and the second member at a second distal end.

3. The portable pneumatic impact wrench testing machine as described in claim 2 wherein the hinged member enables the first member to rotate from an acute orientation to an obtuse orientation with respect to the second member.

4. The portable pneumatic impact wrench testing machine as described in claim 3 wherein the first member is rigidly affixed to a base member; wherein the base member is perpendicularly oriented with respect to the first member; wherein the base member is not at all affixed to the second member, but enables the hinged member and the second member the freedom to rotate with respect to the first member.

5. The portable pneumatic impact wrench testing machine as described in claim 4 wherein the hydraulic jack is secured to the first member via at least one securing member; wherein the hydraulic jack is further defined as including a gauge and compression member.

6. The portable pneumatic impact wrench testing machine as described in claim 1 wherein the hinged member is further defined as including a first hinged member that is rigidly affixed to a first inner surface of the first member; wherein a second hinged member is affixed to a second inner surface of the second member; wherein a hinged member bolt extends across both the first hinged member and the second hinged member.

7. The portable pneumatic impact wrench testing machine as described in claim 2 wherein the first member and the second member each include a bolt member hole that are aligned with one another; wherein the bolt member is designed to san across both the first member and the second member via the bolt member holes.

8. The portable pneumatic impact wrench testing machine as described in claim 7 wherein the bolt member holes are located in between the first distal end and the second distal end such that the bolt member is located in between the hydraulic jack and the hinged member.

9. The portable pneumatic impact wrench testing machine as described in claim 8 wherein the bolt member includes a bolt head that is to be held in place via a wrench while the pneumatic impact wrench rotates the nut via a pneumatic wrench socket.

10. A portable pneumatic impact wrench testing machine comprising:
    a first, member and a second member that rotate with respect to one another via a hinged member;
    wherein a hydraulic jack is sandwiched between the first member and the second member at a distal end opposite of the hinged member;
    wherein a bolt member passes across the first member and the second member, and which includes a nut that is threaded onto the bolt member at an outer surface of the second member;
    wherein the nut is configured for use with a pneumatic impact wrench, which when tightens said nut shall squeeze the first member towards the second member in order to compress the hydraulic jack positioned there between;
    wherein the hinged member is located adjacent to a first distal end of the first member and the second member whereas the hydraulic jack is sandwiched between the first member and the second member at a second distal end;
    wherein the hinged member enables the first member to rotate from an acute orientation to an obtuse orientation with respect to the second member.

11. The portable pneumatic impact wrench testing machine as described in claim 10 wherein the first member is rigidly affixed to a base member; wherein the base member is perpendicularly oriented with respect to the first member; wherein the base member is not at all affixed to the second member, but enables the hinged member and the second member the freedom to rotate with respect to the first member.

12. The portable pneumatic impact wrench testing machine as described in claim 10 wherein the hydraulic jack is secured to the first member via at least one securing member; wherein the hydraulic jack is further defined as including a gauge and compression member.

13. The portable pneumatic impact wrench testing machine as described in claim 10 wherein the hinged member is further defined as including a first hinged member that is rigidly affixed to a first inner surface of the first member; wherein a second hinged member is affixed to a second inner surface of the second member; wherein a hinged member bolt extends across both the first hinged member and the second hinged member.

14. The portable pneumatic impact wrench testing machine as described in claim 10 wherein the first member and the second member each include a bolt member hole that are aligned with one another; wherein the bolt member is designed to span across both the first member and the second member via the bolt member holes.

15. The portable pneumatic impact wrench testing machine as described in claim 14 wherein the boil member holes are located in between the first distal end and the second distal end such that the bolt member is located in between the hydraulic jack and the hinged member.

16. The portable pneumatic impact wrench testing machine as described in claim 15 wherein the bolt member includes a bolt head that is to be held in place via a wretch while the pneumatic impact wrench rotates the nut via a pneumatic wrench socket.

\* \* \* \* \*